J. HELM.
PIPE WRENCH.
APPLICATION FILED OCT. 23, 1911.
1,031,261.
Patented July 2, 1912.
2 SHEETS—SHEET 1.
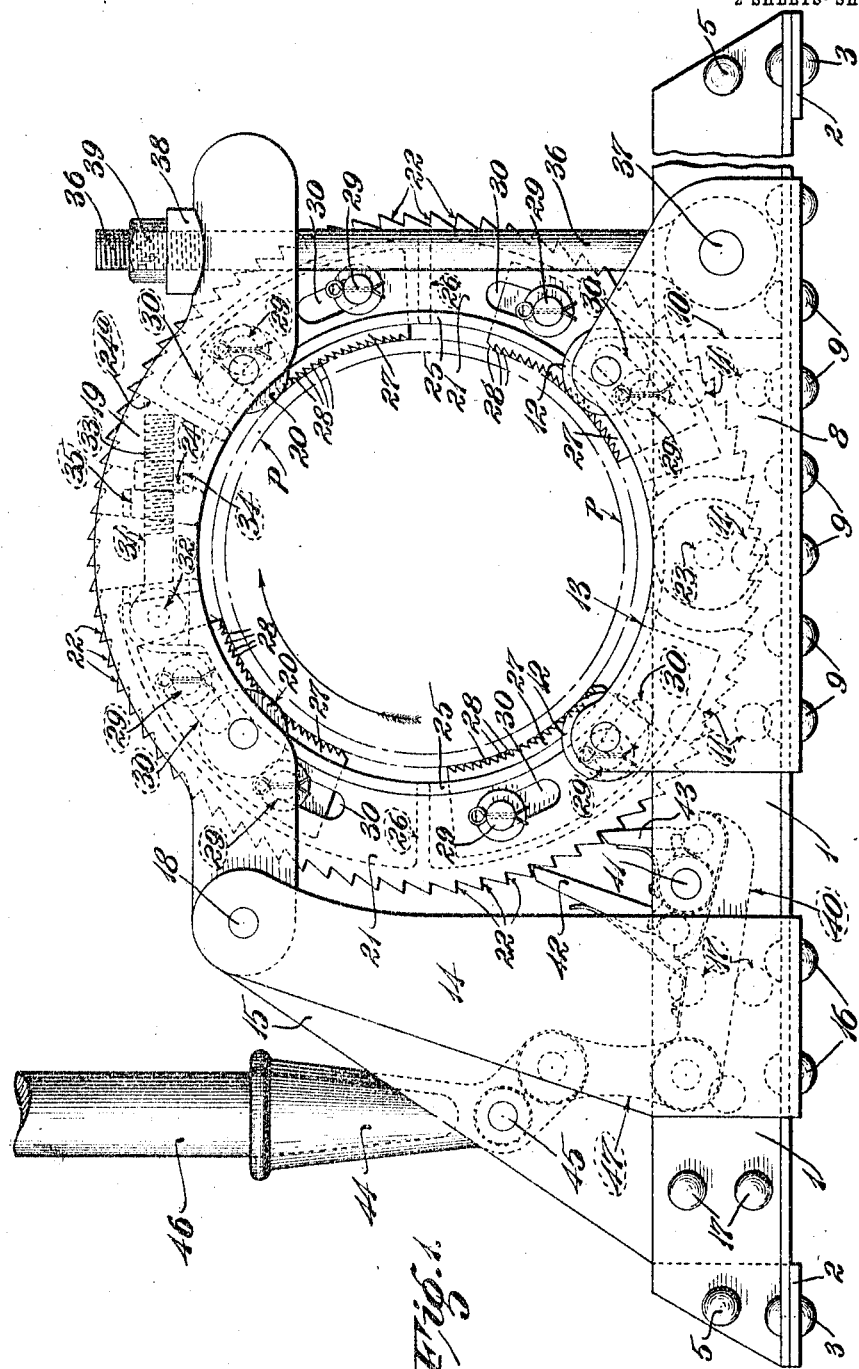
Witnesses:
Edgar T. Farmer
G. A. Pennington
Inventor.
John Helm
By Carr & Carr his Attys J. HELM.
PIPE WRENCH.
APPLICATION FILED OCT. 23, 1911.
1,031,261.
Patented July 2, 1912.
2 SHEETS—SHEET 2.
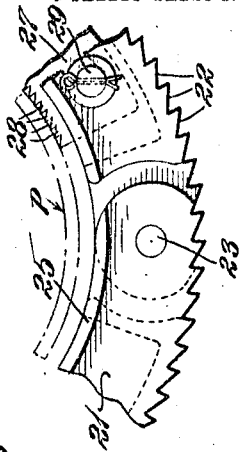
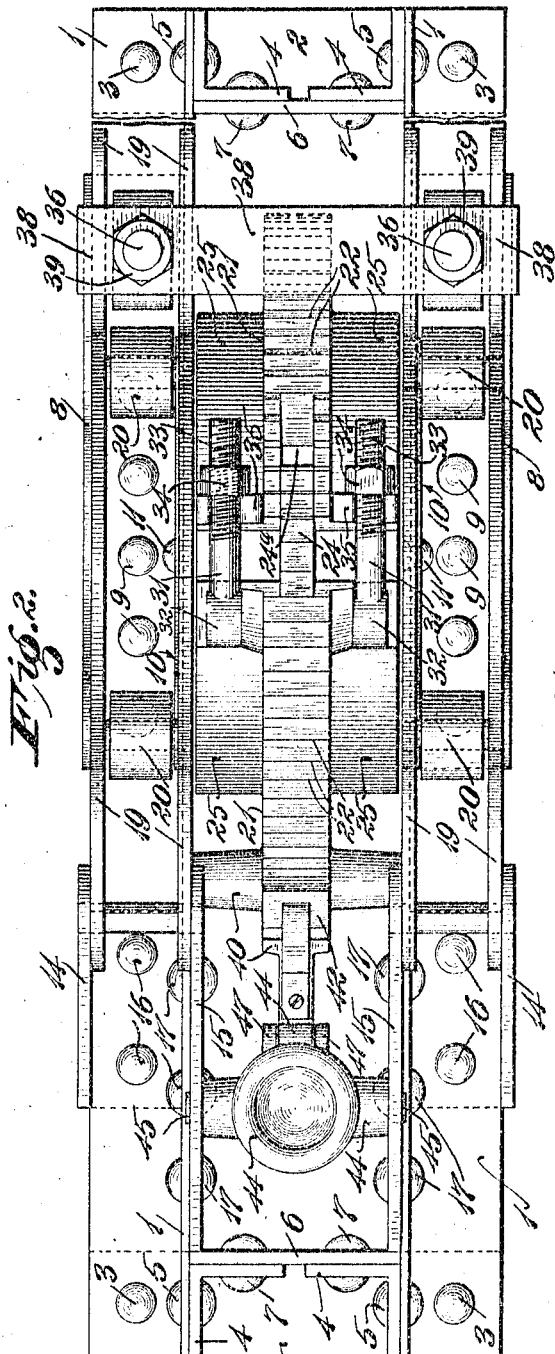
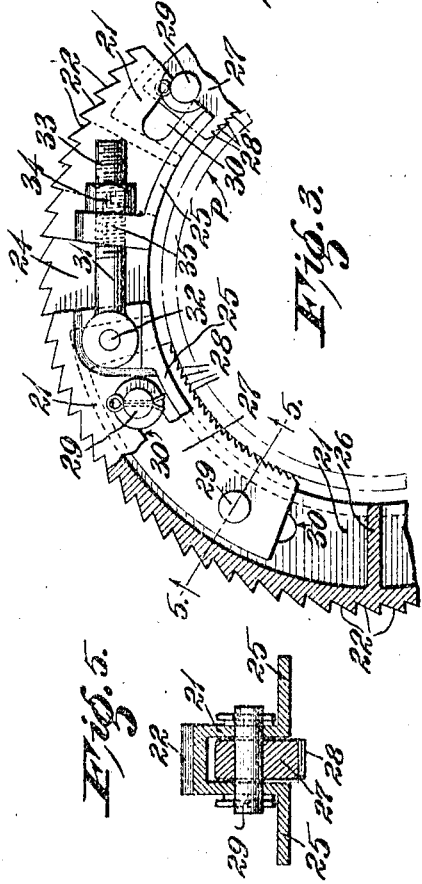
Witnesses:
Edgar T. Farmer
G. A. Pennington
Inventor:
John Helm
By Carr & Carr his attys.

UNITED STATES PATENT OFFICE.

JOHN HELM, OF ST. LOUIS, MISSOURI.

PIPE-WRENCH.

1,031,261.  Specification of Letters Patent.  Patented July 2, 1912.

Application filed October 23, 1911. Serial No. 656,126.

*To all whom it may concern:*

Be it known that I, JOHN HELM, a citizen of the United States, and a resident of the city of St. Louis and State of Missouri, have invented a new and useful Improvement in Pipe-Wrenches, of which the following is a specification.

This invention relates to wrenches and more particularly wrenches for heavy work such as connecting screw-threaded sections of pipe for oil, gas and other pipe lines.

It has for its principal objects to produce a device which can be readily applied and actuated with but slight exertion on the part of the operator, and to attain certain other advantages which will hereinafter more fully appear.

The invention consists in the parts and in the arrangements and combinations of parts hereinafter described and claimed.

In the accompanying drawings which form part of this specification and wherein like symbols refer to like parts wherever they occur, Figure 1 is a side elevation of a device embodying my invention; Fig. 2 is a top plan view; Fig. 3 is a fragmentary view, partly in side elevation and partly in section, of the separable end portions of the two members of the rotary chuck-ring; Fig. 4 is a fragmentary view of the hinged end portions of said members; and Fig. 5 is a section on the line 5—5 of Fig. 3.

The device comprises a supporting base or frame which may obviously be a casting or a built-up structure, as desirable. As shown in the drawings, the base comprises a pair of horizontal side members 1 of angle iron section which are connected at their ends by cross members or plates 2. The plates 2 are riveted, as at 3, to the horizontal flanges of said side members 1. The structure is stiffened by securing angle brackets 4 to the inner faces of the vertical flanges of the side members 1 by rivets 5 and connecting said angle brackets to plates 6, as by rivets 7.

Secured to the side members 1 are angle plates 8 whose horizontal flanges are riveted to the under side of the horizontal flanges of the members 1 by rivets 9; and plates 10 are secured to the outer faces of the vertical flanges of said angle members 1 by rivets 11. These plates 8 and 10 are arranged in oppositely disposed pairs and journaled between the respective pairs of plates are rollers 12; and the top edge portions of said plates, between the rollers, are concaved as at 13 so as to be clear of the pipe P which is supported on the rollers in the manner hereinafter more fully appearing and as shown by the broken lines in Figs. 1, 3 and 4.

Secured near the ends of the angle members 1 are two oppositely disposed pairs of standards or uprights 14 and 15. The upright 14 of each pair comprises a plate having its lower end portion flanged and secured to the under side of the horizontal flange of the member 1 by rivets 16. The plates 15 are secured to the inner faces of the vertical flanges of the members 1 by rivets 17. Pivoted between the respective pairs of uprights 14, 15, as at 18, are yokes each comprising a pair of parallel side members 19 between which are journaled rollers 20. The portions of the yoke members 19 between said rollers 20 are curved to clear the pipe P the same as the plates 8 and 10 are concaved at their upper edge portions. The rollers 12 and 20 provide antifriction four-point supports for the pipe.

A ratchet chuck-ring 21 having a series of peripheral teeth 22 is secured on the pipe P. This chuck-ring comprises two half members hinged at one end as by a rule joint 23, the opposite ends of said members being respectively reduced as at 24 and bifurcated as at 24ᵃ so as to slidably fit together. The chuck-ring members are made hollow or substantially U-shape in transverse section, as shown, and provided with annular flanges 25 on opposite sides at their inner edges. These flanges serve to stiffen the members and also to center the ratchet portion between the side frames of the machine, as shown more clearly in Fig. 2. At intervals the members 21 may be further stiffened by interior radial webs 26. Segmental clutch-blocks 27 are fitted loosely in the channel portions of the ring-members 21, and the clutch faces of the blocks are provided with teeth 28 or otherwise suitably roughened so as to grip the pipe. The blocks are provided with transverse pins 29 which project through cam slots 30 in the side walls of the ring members 21. The cam slots are inclined so that when the ratchet ring is rotated the tendency is for the clutch blocks to lag and they are thereby moved toward the axis of the pipe by the action of the pins 29 in the slots 30. Hence, the teeth 28 on the clutch blocks are caused to firmly grip upon or take into the surface of the pipe. Any desirable number of the segmental clutch blocks may be provided, but it is preferable to use four, substantially as shown.

The separable end portions of the ring members 21 are releasably connected by links or bolts 31 which are pivoted, as at 32, to one of the ring members. Said bolts are screw-threaded, as at 33, to receive nuts 34 which bear against bifurcated lugs 35 on the opposite ring member, into which bifurcations the bolts are adapted to loosely fit.

In practice, the ratchet chuck-ring is secured on the pipe, and the latter is laid on the bottom rollers 12 with the chuck-ring interposed between the two side frames. The yoke members 19 are then swung over above the pipe until the rollers 20 rest thereon. The yoke members are then fastened by links or bolts 36 which are pivoted at their lower ends between the vertical flanges of the side members 1 and ends of the side plates 8, as at 37. The upper end portions of the bolts 36 are screw-threaded and inserted loosely through perforations in a cross bar 38 which rests on top of the yoke members 19. Preferably, the bottom face of the cross bar 38 is convexed and the yoke members are provided with counterpart notches in which the bar is seated. Clamping nuts 39 are placed on the screw-threaded ends of the bolts to impinge against the upper face of said cross bar.

Mounted between the side frames is a rocking lever 40 which is journaled as at 41. This rocking lever is provided with ratchet pawls 42 and 43 which are located respectively on opposite sides of the pivot of said lever so as to engage the ratchet teeth 22 of the chuck-ring to impart motion thereto on both the up and down strokes of the rocking lever. A bellcrank 44 is journaled, as at 45, between the two upright plates 15. The upper arm of this bellcrank is provided with a socket to receive a lever bar 46. The opposite arm of said bellcrank is pivotally connected to one end of a link 47 whose opposite end is pivoted to the rocking lever 40. It will thus be seen that the compound leverage is such that the force necessary to actuate the device is minimized and that heavy pipes such as used in oil and gas pipe lines may be readily connected; and the labor incidental to such work is also minimized.

In practice, the base members 1 are preferably made long enough to span a trench so that the pipe sections may be coupled above the surface of the ground and then lowered into the trench.

Obviously, the device admits of considerable modification without departing from my invention. Therefore, I do not wish to be limited to the specific construction and arrangement shown.

What I claim is:

1. A wrench comprising a base frame having means for rotatably supporting a pipe, a chuck-ring adapted to be secured on the pipe, said chuck-ring having an annular series of ratchet teeth thereon, a rocking lever pivoted on said base frame, a pawl on said rocking lever adapted to engage said ratchet teeth on the chuck-ring, and a hand lever operatively connected and adapted to actuate said rocking lever.

2. A wrench comprising a base frame having means for rotatably supporting a pipe, a chuck-ring adapted to be secured on the pipe, said chuck-ring having an annular series of ratchet teeth thereon, a rocking lever pivoted on said base frame, two pawls on said rocking lever located respectively on opposite sides of its pivot and engaging said ratchet teeth, and a hand lever operatively connected and adapted to actuate said rocking lever.

3. A wrench comprising means for rotatably supporting a pipe, a chuck-ring adapted to be secured on the pipe, said chuck-ring having an annular series of ratchet teeth thereon, a rocking lever, a pawl on said rocking lever adapted to engage said ratchet teeth on the chuck-ring, a bellcrank operating lever, and a link pivotally connecting between said bellcrank and rocking lever.

4. A wrench comprising means for rotatably supporting a pipe, a chuck-ring adapted to be secured on the pipe, said chuck-ring having an annular series of ratchet teeth thereon, a rocking lever, two pawls on said rocking lever located respectively on opposite sides of its pivot, a bellcrank operating lever, and a link pivotally connecting between said bellcrank and rocking lever.

5. A wrench comprising a transversely extending base frame, said base frame comprising spaced parallel pairs of side members, rollers journaled on said base frame side members so as to rotatably support a pipe, a yoke member movably mounted on said base frame above said side members, rollers journaled on said movable yoke member, means for detachably holding said movable yoke member with its rollers in contact with the pipe, a chuck-ring adapted to be detachably secured on the pipe, and a power device coöperating with said chuck-ring to rotate the pipe.

6. A wrench comprising means for rotatably supporting a pipe, a chuck-ring adapted to be placed around the pipe, clutch members on said chuck-ring adapted to engage the pipe, said clutch members being movably mounted and arranged so that when the chuck-ring is rotated in one direction they tend to move inwardly so as to grip the pipe, and means coöperating with the chuck-ring to effect the rotation of the pipe or its support.

7. A wrench comprising a base frame having parallel side members having means for rotatably supporting a pipe thereon, a channeled chuck-ring comprising two members pivotally connected at one end and having means whereby their opposite ends are detachably and adjustably connected, said chuck-ring being fitted loosely between the side members of the base frame, clutch-blocks mounted loosely in the channels of said chuck-ring and adapted to engage the pipe, and cam means for supporting said clutch blocks so that they tend to move toward the axis of the chuck-ring when the latter is rotated in one direction.

Signed at St. Louis, Missouri, this 18th day of October, 1911.

JOHN HELM.

Witnesses:
G. A. PENNINGTON,
PAULINE AMBERG.